United States Patent Office 3,531,557
Patented Sept. 29, 1970

3,531,557
PROCESS FOR PREPARING SALINE SOLUTIONS
OF ACRYLONITRILE POLYMERS
Robert Harbes Becker and Allan Olaf Mogensen, Somerville, N.J., assignors to American Cyanamid Company, Stamford, Conn., a corporation of Maine
No Drawing. Filed Jan. 26, 1968, Ser. No. 700,724
Int. Cl. B29b 1/00; C08f 47/16
U.S. Cl. 264—101  5 Claims

ABSTRACT OF THE DISCLOSURE

A process for preparing aqueous salt solutions of polymers of acrylonitrile comprising dispersing the polymer in an aqueous salt solution containing less than the critical concentration of salt. The dispersion is formed into a film which is heated while applying shear forces thereto to evaporate water therefrom. Sufficient water is evaporated to increase the salt concentration above the critical concentration and thereby dissolve the polymer. The polymer solution can be used to produce shaped articles such as fibers.

---

This invention relates to a method of making solutions of polymers of acrylonitrile. More particularly, this invention relates to a method for preparing solutions of polymers of acrylonitrile from aqueous dispersions thereof containing less than the critical concentration of salts normally employed to dissolve polymers of acrylonitrile.

The term "critical concentration" as used herein refers to the minimum concentration of salt which, at a given temperature, is required to form with water an aqueous solvent for a polymer of acrylonitrile. The concentration of salt required to meet the "critical concentration" is temperature dependent, lower concentrations being required at higher solvent temperatures. It is also dependent to some extent on the nature and proportion of comonomers present in the polymer of acrylonitrile and the molecular weight of such polymer.

The term "polymer of acrylonitrile" as used herein refers to polymers which contain at least 70% polymerized acrylonitrile. The polymer of acrylonitrile can be homopolymeric or it can be a copolymer with at least one other ethylenically unsaturated comonomer. Illustrative of the numerous ethylenically unsaturated comonomers polymerizable with acrylonitrile are those mentioned in Coleman, U.S. Pat. 3,222,118 and Cummings, U.S. Pat. 2,948,581 and the various other patents referred to in each of these patents.

The term "dope" as used herein refers to solutions of polymers of acrylonitrile.

To use polymers of acrylonitrile for forming shaped articles, such as fibers, it is conventional to dissolve them in suitable solvents. Such solvents include certain organic materials, such as dimethylformamide, dimethylacetamide, ethylene carbonate, etc. and concentrated aqueous solutions of certain salts such as sodium thiocyanate, zinc chloride, calcium nitrate, etc. The present invention is concerned with spinning dopes based upon aqueous salt solvents. Illustrative of the salts which, in sufficiently concentrated aqueous solutions, are useful as solvents for such polymers of acrylonitrile are those mentioned in Rein, U.S. Pat. 2,140,921 and the aforesaid Coleman patent. These water-soluble salts are ones which yield highly hydrated ions in aqueous solution. Also, mixtures of such salts can be used as disclosed in Stanton et al., U.S. Pats. 2,648,646 and 2,648,647. As used herein, the term "a salt" refers to such salts or mixtures thereof, which, in sufficiently concentrated aqueous solution, act as solvents for polymers of acrylonitrile.

Polymers of acrylonitrile can be dispersed in the aqueous salt solvent by adding the polymer thereto while continually stirring and heating the resultant mixture until the polymer dissolves. Unfortunately, long periods of time are generally required to uniformly dissolve the polymer in the aqueous medium. The longer the polymer is heated, the greater the chance of polymer discoloration. Several techniques have been proposed for preparing these solutions in an effort to reduce or minimize polymer degradation or discoloration caused by heat and to improve the uniformity of the solution. Attempts have been made at heating for shorter intervals. However, with prior techniques, heating for shorter time intervals was not adequate to fully dissolve the slow-dissolving polymer aggregates and the undissolved remainder interferred with spinning and/or led to non-acceptable products.

One of the methods presently employed to reduce heating time includes first cooling the aqueous salt solution to below the minimum temperature at which the salt solution functions as a polymer solvent. This permits efficient agitation to uniformly disperse the polymer therein before any polymer starts to dissolve. The dispersion is then heated to dissolve the polymer. Another method involves dispersing the polymer in an aqueous salt solution of a concentration insufficient to serve as a solvent and then adding salt or a very concentrated salt solution to the dispersion in amounts sufficient to raise the salt concentration to above the critical concentration and thus dissolve the polymer. Though both techniques reduce the amount of incompletely dissolved polymer and slightly reduce the time required at elevated temperature to dissolve the polymer, unfortunately, neither technique sufficiently reduces the heating time to completely eliminate solution discoloration and polymer aggregates. In these prior art techniques, the discoloration is worse at the higher polymer concentrations.

The prior art techniques require that the aqueous salt solution be stirred or agitated while the polymer is being slurried and then dissolved. Due to the viscosity increase resulting from added polymer, the maximum concentration of polymer solids useful for such slurries is about 30%. This limits the concentration of polymer in the dope produced by these prior art techniques to such value in the first of such techniques or to a lower value when the second of such techniques is used. Stirring or agitation also materially increases the possibility of air entrapment in the dope and either the shaped articles produced therefrom are of poor quality or it becomes necessary to subject the dope to prolonged heated deaeration prior to using it and thereby increase process cost. Furthermore, present deaeration techniques involve heating the dope for even short periods of time which increases the probability of dope discoloration.

It is an object of the present invention to provide aqueous solutions containing high concentrations of polymers of acrylonitrile. It is a further object of the present invention to provide a process for preparing aqueous solutions with high concentrations of polymers of acrylonitrile having excellent color and uniformity. Further objects of the present invention will become evident from the following description.

In accordance with the present invention, a polymer of acrylonitrile is dispersed in an aqueous salt solution containing less than the critical concentration of salt. The dispersion is formed into a film which is heated at subatmospheric pressure while applying shear forces thereto to remove a controlled amount of water sufficient to increase the salt concentration in the film above the critical concentration and thereby form a dope. It has been found that by operating in this manner, dopes having high polymer concentrations of up to about 50 weight percent can be produced. Furthermore, the temperature and time of heating to effect dissolution of the polymer are materially reduced so that the dope obtained is characterized by excellent color and uniformity.

The method for preparing the initial dispersion of polymer in the aqueous salt solution is not critical so long as the polymer of acrylonitrile is not dissolved in the salt solution. A suitable method for preparing the dispersion of polymer and salt solution involves mixing a salt solution containing less than the critical concentration of salt with a polymer of acrylonitrile in crumb form. The mixture of polymer and solution is stirred or agitated to effect quick dispersion of the polymer particles.

The polymer of acrylonitrile can be introduced in any convenient form or manner to the salt solution. Though the polymer can be dry, preferably the polymer containing about 20 to about 50 weight percent water can be employed. The use of wet polymer further reduces the possibility and tendency of the polymer to ball up or form agglomerates.

For the practice of this invention, use can be made of any salt which forms, with water, a solvent for polymers of acrylonitrile when above the critical concentration. All such solvents known in the prior art can be used.

The dispersion is then directed to an apparatus which is suitable for forming a thin film from the dispersion. The film is heated under vacuum to remove water therefrom and thereby increase the salt concentration in the film. During the heating, the film is subjected to shear forces which tend to increase the rate of heat transfer into the film, thus increasing the rate of water removal and reducing heating time. The film is heated until the salt concentration therein is increased to above the critical concentration thus causing the polymer to dissolve and form the dope. To minimize discoloration caused either by excess temperature or by excess heating times, the film is heated to a temperature of less than about 150° C. and preferably within the range of from about 85° C. to about 110° C. While the film is heated, a vacuum is applied so that a pressure below about 15 inches Hg absolute is maintained to thereby further reduce heating time. Operating at reduced pressure also minimizes the possibility of gas being mixed with the dope. It is desirable that the pressure be minimized in order to minimize the temperature and heating time necessary to remove the required amount of water. Within the limits of the available apparatus, the pressure is usually maintained between about 13 inches Hg absolute and about 3 inches Hg absolute.

Elapsed time for the removal of the required amount of water from the film is very short, usually less than about a few minutes. Consequently, polymer discoloration is also held to an absolute minimum. The time required to form the dope necessarily varies with the temperature, thickness, surface area and turbulence of the film and the environmental pressure in addition to the solubility characteristics of the particular polymer composition and molecular weight. These factors can be varied in a well known manner to minimize both the temperature required and the heating time required to increase the concentration of salt above the critical concentration in the polymer mixture.

Choice of the apparatus which is employed to form the dope from the film is not critical to the process of this invention. Thus, the dispersions can be formed into a film on the inside wall of a heated cylinder by rotating blades located within a heated cylinder. The rotating blades also move the film through the cylinder to the cylinder exit. This apparatus permits a continuous operation whereby the dispersion is continually fed to and the dope is continually removed from the cylinder. The blades exert a wiping action on the film to apply a shear force thereto and thereby facilitate water removal. A typical apparatus of this type is described in a product bulletin entitled, "Votator ® Turbo-Film Processor" published by the Chemtron Corporation (Form No. V284-5-1165). Other suitable apparatus which can be employed to form and heat the film with added turbulence will be apparent to those skilled in the art.

The initial dispersion contains less than the critical concentration of salt. However, the amount of salt mixed in the dispersion should be sufficient so as not to require an excessive amount of water to be removed from the dispersion to form the dope. To form the dope a minimum amount of water is required even though the salt concentration is above the critical concentration. Furthermore, removal of an excessive amount of water from the dispersion causes an undesirably high solution viscosity and increases the difficulty of recovering a satisfactory dope. The amount of salt mixed in the dispersion also depends upon the particular salt employed. Sodium thiocyanate, for example, has a critical concentration at room temperature between about 35 and about 40 weight percent. When employing sodium thiocyanate, the initial dispersion can contain from about 5 to about 35 weight percent polymer, from about 1 to about 32 weight percent salt and from about 42 to about 95 weight percent water. Regardless of the particular salt employed, it is preferred that the concentration of polymer in the dispersion be maximal. However, the polymer concentration should be less than that which increases the viscosity of the dispersion to a point which causes difficulty in pumping. Furthermore, it is preferred to employ the lowest amount of water since the amount of heat required to cause evaporation thereof will be minimized. Polymer in amounts from about 7 to about 30 weight percent and water in amounts of from about 45 to about 65 weight percent in the dispersion provide high quality dopes while minimizing heating requirements. The amount of water evaporated from the dispersion can range from only a few percent to about 50 percent of the water originally contained in the mixture. In accordance with the present invention, sufficient water is evaporated from the dispersion to obtain a dope having up to about 50 weight percent.

The following examples illustrate the process of the present invention and they are not intended to limit the same.

EXAMPLE 1

A dispersion is prepared by thoroughly mixing polyacrylonitrile and an aqueous solution of sodium thiocyanate. The dispersion contains 0.11 part polymer, 0.205 part NaCNS and 0.685 part water (23.2 percent salt in aqueous phase) and is metered to a Model 04–012 Votator Turbo-Film Processor at a rate of 1.5 gal. per minute to form a film therein. The Votator heating jacket temperature is 110° C. Internal absolute pressure is 13 inches of Hg. In processing, 0.354 part water is removed from the dispersion film. The discharge product is a deaerated uniform spinning dope of extremely good color comprising 0.235 part polymer dissolved in 0.434 part NaCNS and 0.331 part water (56.8 percent NaCNS on a solvent basis). This example illustrates one embodiment of this invention.

EXAMPLE 2

A dispersion is prepared as in Example 1 comprising 0.15 part copolymer of 90% acrylonitrile and 10% methyl methacrylate, 0.23 part NaCNS and 0.62 part water (27.0% NaCNS on aqueous phase basis). This dispersion is processed in the Votator as in Example 1 to form a film on the inside cylinder wall. In processing, 0.295 part water is removed from the dispersion film. The discharge product is a uniform, clear, deaerated dope of 0.267 part copolymer dissolved in 0.408 part NaCNS and 0.325 part water (55.7% NaCNS on solvent basis).

In a separate test, the rate at which the dispersion is metered to the Votator is increased from 1.5 gal./min. to 2.85 gal./min. to produce a dispersion film. To maintain approximately the same amount of water removal, the internal absolute pressure is reduced to 6 inches of Hg. Consequently, 0.305 part of water is removed from the film to yield a spinning dope almost identical with the one obtained at the lower feed rate and higher pressure. In other experiments, it is found that similar compensating changes in the operating temperature may be used. For instance, a higher temperature tends to extract the water faster for a given pressure and feed rate. This example is illustrative of the wide range of processing conditions which can be employed in this invention.

EXAMPLE 3

To demonstrate the importance of a thin film processing to the instant invention, a dispersion dehydration is carried out with a dispersion in bulk form in a mixer having a vapor condensing means to which is applied a vacuum. A dispersion is prepared as in Example 1 comprising 1280 g. copolymer 93.8% acrylonitrile and 6.2% methyl methacrylate, 1495 g. NaCNS and 3312.6 g. water (31% NaCNS on aqueous phase). 12 grams of $Na_2S_2O_5$ and 0.4 g. ethyleneaminetetraacetic acid are added as color stabilizers. The dispersion is transferred to the mixer after which the jacket of the mixer is heated to 45° C. and internal pressure reduced to 23 mm. of Hg. Mixing is continued for one hour with very little water removal. A bulk temperature of 70° C. and a pressure of 100 mm. of Hg are maintained while the dispersion is continuously mixed an additional 80 minutes during which time, 1050 grams of water are removed. Inspection of the mix shows that no polymer has yet been dissolved. Mixing is continued for another 75 minutes at 100 mm. of Hg pressure while the temperature is maintained at 80° C. 950 grams of water are removed during this period for a total of 2000 grams. Inspection shows that the polymer is discolored due to the extended period of time under heated conditions which were required to remove sufficient water to cause dissolution of the polymer. In addition, because of the mixing required to evenly dehydrate a large mass, the dope contains a large quantity of entrapped air and requires a separate deaerating operation at high temperature which further discolors the spinning dope and fibers spun from it.

This example illustrates the disadvantage of the prior art which the present invention overcomes.

We claim:

1. A process for preparing aqueous salt solutions of polymers of acrylonitrile comprising dispersing the polymer in an aqueous salt solution containing less than the critical concentration of salt, forming a thin film from the dispersion, and heating the film under vacuum while applying shear forces thereto to evaporate water therefrom thereby increasing the salt concentration in the film to above the critical concentration and dissolving the polymer.

2. The process of claim 1 wherein the salt is sodium thiocyanate.

3. The process of claim 1 wherein the dispersion contains from 7 to 30 weight percent polymer, and from 45 to 65 weight percent water.

4. The process of claim 2 wherein the concentration of sodium thiocyanate in the film following the heating step is between 40 and 65 weight percent.

5. The process of claim 1 wherein the polymer of acrylonitrile is a copolymer of acrylonitrile and methyl methacrylate containing at least 70% acrylonitrile.

References Cited

UNITED STATES PATENTS 2,605,246    7/1952    Cresswell et al.

FOREIGN PATENTS 594,999    11/1947    Great Britain.

ROBERT F. WHITE, Primary Examiner

J. H. SILBAUGH, Assistant Examiner

U.S. Cl. X.R.

260—29.6, 34.2